Dec. 13, 1966   E. J. HOLDEN   3,292,068
SATURABLE REACTOR MOTOR SPEED CONTROL CIRCUIT
Filed Feb. 26, 1964   2 Sheets-Sheet 1

Inventor
Edward John Holden
By Cushman, Darby & Cushman
Attorneys

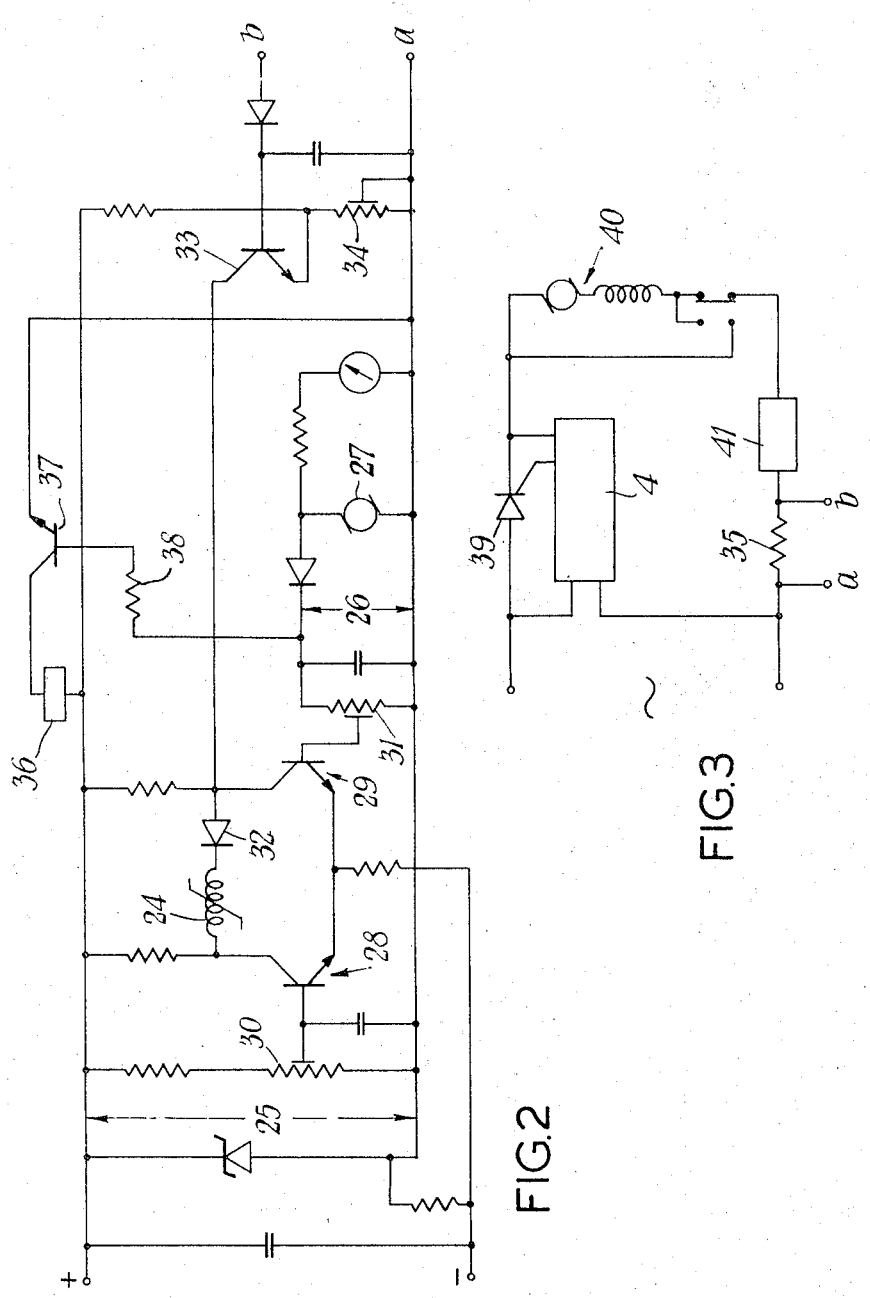

United States Patent Office 3,292,068
Patented Dec. 13, 1966

3,292,068
SATURABLE REACTOR MOTOR SPEED
CONTROL CIRCUIT
Edward John Holden, Crawley, Sussex, England, assignor to M.S.E. Holdings Limited, London, England, a British company
Filed Feb. 26, 1964, Ser. No. 347,476
Claims priority, application Great Britain, Mar. 1, 1963, 8,404/63
10 Claims. (Cl. 318—327)

This invention relates to centrifuges and is concerned more particularly with the speed control of centrifuges.

In accordance with the invention there is provided a centrifuge including an electric motor, the motor having a speed control circuit comprising a switching circuit, incorporating at least one controllable semi-conductor rectifier device, and a control signal supply circuit for the switching circuit arranged to supply control signals to the or each rectifier device, there being means for adjusting the phase position of the control signals with respect to an alternating reference voltage whereby the speed of the motor may be controlled.

An error sensing circuit may be employed to complete a feed-back circuit including the motor, the switching circuit and the control signal supply circuit.

For a better understanding of the invention and to show how the same may be carried into effect, reference will now be made, by way of example, to the accompanying drawings, in which:

FIGURE 2 shows a detail of FIGURE 1, and

FIGURE 3 shows a modification of FIGURE 1.

Figure 1:
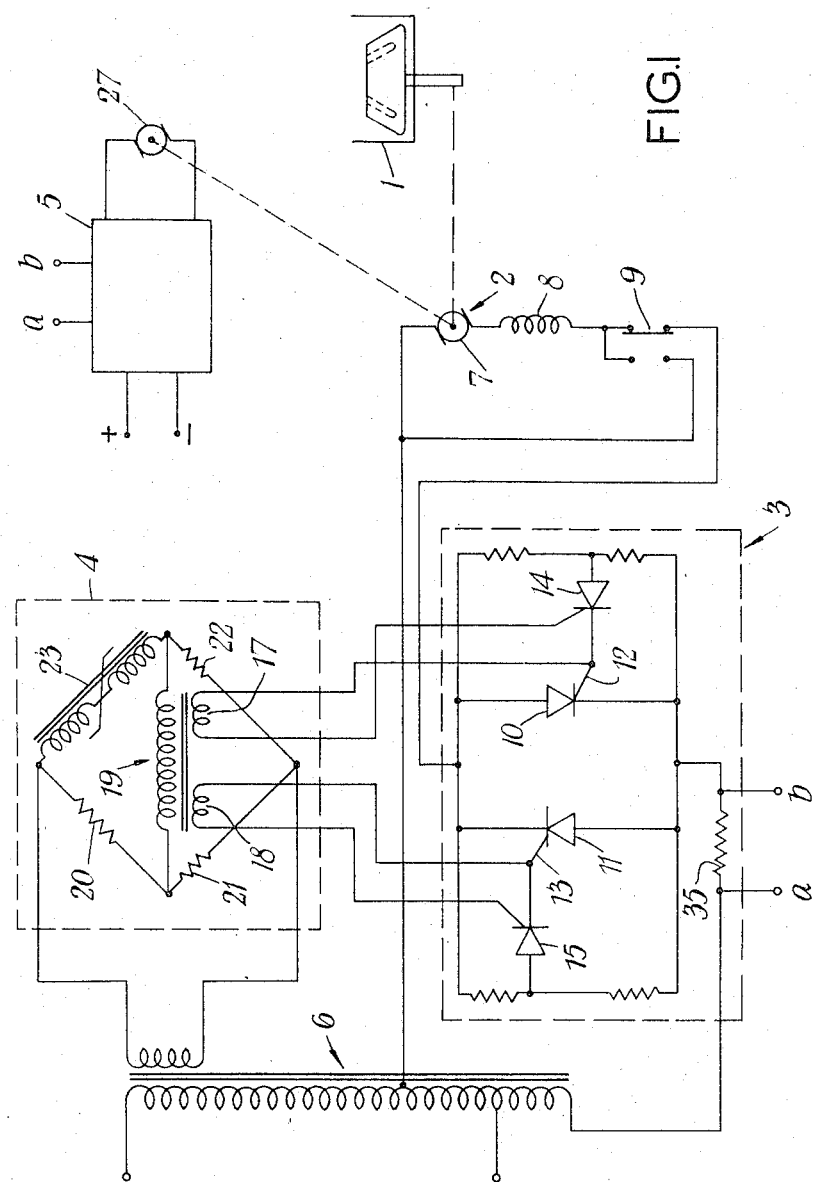
FIGURE 1 shows a centrifuge in combination with a speed control circuit.

This embodiment comprises a centrifuge 1, connected to an electric motor 2, and a speed control circuit for the motor.

The speed control circuit may be considered as comprising three parts, a switching circuit 3 for supplying current to the motor 2, a control circuit 4 for controlling the switching circuit 3, and an error sensing circuit 5 completing a feed-back loop in the combined arrangement of the motor and these three parts. The parts are supplied by current from a transformer 6, the part 5 being fed from a rectifier bridge (not shown) connected to the transformer.

The switching circuit 3, the motor armature 7, the motor field winding 8 and an A.C. source, comprising a portion of the transformer 6, are so connected as to be in series when a main switch 9 is actuated to take up a position as shown in FIGURE 1. The switching circuit 3 includes two main silicon controlled rectifier devices 10 and 11 (thyristors) connected oppositely and in parallel so that both the positive and negative parts of the current from the A.C. source may be fed to the motor 2, one silicon controlled rectifier device being arranged to pass the positive part of the current and the other to pass the negative part of the current.

These silicon controlled rectifier devices operate in a manner similar to thyratrons. That is, each has a control electrode, 12 and 13 respectively, by which the main current path through the rectifier device can be switched from a non-conducting to a conducting state in accordance with a control signal applied to the control electrode.

Each main silicon controlled rectifier device has a subsidiary and lower rated silicon controlled rectifier device, 14 and 15, connected to its control electrode for applying a control signal to that control electrode. These subsidiary rectifier devices are provided to give sufficient voltage at the control electrodes 12 and 13 of the main rectifier devices for their operation.

The subsidiary rectifier devices 14 and 15 are arranged to be switched by signals derived from two secondary windings 17 and 18 of a transformer 19 contained in the control circuit 4. The phase position of these signals with respect to some reference signal determines the moments at which the rectifier devices 10 and 11 are switched and therefore determines the current supplied to the motor 2. Speed control may thus be effected by controlling the phase of the two signals emanating from the control circuit 4.

The control circuit 4 is a bridge circuit fed from the transformer 6, supplying the reference signal, the transformer 19 being connected to the output of the bridge circuit. Three of the bridge arms are resistors 20, 21 and 22, whilst the fourth contains a saturable reactor 23. The inductance of this reactor 23, which inductance determines the relative phase of the output signals of the transformer 19, is controlled by a D.C. current supplied to a control winding 24 (FIGURE 2) of the reactor 23, which control winding is contained in the error sensing circuit 5. The combination of the control circuit 4 and the switching circuit 3 therefore provides a speed control arrangement for the motor 2, the speed being dependent on the value of D.C. current in the control winding 24 of the saturable reactor 23.

The error sensing circuit 5 is provided to stabilise the operation of the arrangement. This circuit includes the control winding 24 of the reactor 23 together with two inputs 25 and 26, one of which, 25, is arranged to receive a D.C. reference voltage from transformer 6 and the other, 26, a voltage which is a function of the motor speed and which is derived from a tachometer generator 27 in driving connection with the motor 2.

The error sensing circuit 5 is arranged to compare the voltages received at the inputs 25 and 26 and to vary the current in the control winding 24 should the comparison indicate that the speed of the motor 2 is not equal to that speed equivalent to the value of the reference voltage. Thus the value of the reference voltage determines the speed of the motor, this reference voltage advantageously being made variable in order that a range of speeds may be covered by the speed control circuit.

Considering the error sensing circuit 5 in more detail it includes a long-tailed pair transistor arrangement, 28 and 29, for comparing the reference voltage and the tachometer generator voltage. The reference voltage is arranged to be applied to the base of the transistor 28 by way of a potentiometer 30 which provides the adjustment for the desired speed of the motor 2. The voltage of the tachometer generator 27 is arranged to be fed to the base of the transistor 29 by way of a further potentiometer 31. The control winding 24 of the reactor 23 is in series with a rectifier element 32, this series arrangement being connected between the collectors of the transistors 28 and 29. The rectifier element serves the function of allowing current to flow in the control winding 24 in one direction only.

A current limiting arrangement is incorporated in the error sensing circuit, the arrangement including a transistor 33 which is normally in its cut-off state, but is arranged to be switched on when the motor current exceeds a value determined by the bias of the transistor. The bias itself is determined by a potentiometer 34.

A resistor 35 (FIGURE 1) in series with the controlled rectifier devices 10 and 11 is employed to feed a voltage to the base of transistor 33, which voltage is proportional to the motor current. The resistor 35 is connected to the transistor by terminals a and b (FIGURES 1 and 2). When a given motor current, determined by the setting of potentiometer 34, is exceeded, the transistor 33 is switched on and commences its current regulating operation. As the collector of transistor 33 is connected to the collector of transistor 29, the voltage across the control winding 24 will drop when the transistor 33 is switched on. This voltage will continue to drop should the motor current increase subsequently. This operation causes the motor current to drop whereby the controlled rectifier devices 10 and 11 may be protected against excessive current.

Also incorporated in the error sensing circuit 5 is a contact breaker arrangement operable should the speed of the motor increase impermissibly. A contact breaker 36 is connected to the collector of a transistor 37, the base of which is arranged to receive the tachometer generator voltage via resistor 38. Should this voltage rise excessively, the transistor 37 will be switched-on, thereby causing the contact breaker 36 to be actuated. On such actuation, the motor 2 is arranged to be cut-off, for example by the contact breaker disconnecting the supply of alternating current from the transformer 6 or the motor from the switching circuit 3.

It will be apparent that a D.C. electric motor may be employed with the above-described circuit if a full- or half-wave rectifier is connected between the switching circuit 3 and the motor 2. Preferably a current smoothing arrangement is also incorporated.

Furthermore, as is shown diagrammatically in FIGURE 3, a single, controlled rectifier device 39 may be employed when using a D.C. motor 40. Again it is preferred that a smoothing arrangement 41 be employed to smooth the motor current. When necessary, a subsidiary controlled rectifier devine may be employed as for the circuit of FIGURE 1.

Of course the subsidiary rectifier devices need not be employed in the A.C. arrangement described if the signals from the control circuit 4 provide sufficient voltage at the control electrodes of the main rectifier devices.

I claim:

1. An electric motor in combination with a speed control circuit comprising: a current supply circuit connected to said electric motor for supplying current thereto; at least one controllable semi-conductor rectifier device in said current supply circuit; a bridge circuit; a saturable reactor comprising one arm of said bridge circuit; an output of said bridge circuit connected to said controllable semi-conductor rectifier device for supplying control signals from said bridge circuit to said rectifier device; a control winding of said saturable reactor for adjusting the phase position of said control signals; whereby the speed of said electric motor may be controlled by said control winding for adjusting the phase position of said control signals; an error sensing circuit connected to said control winding for supplying thereto an electrical error signal which is a function of the difference between the required and the actual speed of said electric motor so as to cause the speed of said electrical motor to be controlled in a manner such as to reduce said electrical error signal, said error sensing circuit including a pair of transistors in a long-tailed pair configuration, said control winding connected between the collectors of said pair of transistors; motor current regulating means; a transistor in said motor current regulating means; means connected to supply a voltage which is a function of current in said electric motor to the base of said transistor for rendering said transistor conductive when a predetermined motor current is exceeded; and the collector-emitter path of said transistor connected to said control winding so as to cause, when said transistor is rendered conductive, the mean value of current in the said electric motor to be reduced.

2. An electric motor in combination with a speed control circuit comprising: a current supply circuit connected to said electric motor for supplying current thereto; at least one controllable semi-conductor rectifier device in said current supply circuit; a bridge circuit; a saturable reactor comprising one arm of said bridge circuit; an output of said bridge circuit connected to said controllable semi-conductor rectifier device for supplying control signals from said bridge circuit to said rectifier device; a control winding of said saturable reactor for adjusting the phase position of said control signals; whereby the speed of said electric motor may be controlled by said control winding for adjusting the phase position of said control signals; an error sensing circuit connected to said control winding for supplying thereto an electrical error signal which is a function of the difference between the required and the actual speed of said electric motor so as to cause the speed of said electrical motor to be controlled in a manner such as to reduce said electrical error signal, said error sensing circuit including a pair of transistors in a long-tailed pair configuration; a unidirectional device connected in series with said control winding; motor current regulating means; a transistor in said motor current regulating means; means connected to supply a voltage which is a function of current in said electric motor to the base of said transistor for rendering said transistor conductive when a predetermined motor current is exceeded; and the collector-emitter path of said transistor connected to said control winding so as to cause, when said transistor is rendered conductive, the mean value of current in the said electric motor to be reduced.

3. In combination, a centrifuge; an electric motor coupled to said centrifuge; and a speed control circuit for said electric motor and comprising: a switching circuit connected to said electric motor for supplying current to said electric motor; at least one controllable semi-conductor rectifier device in said switching circuit; a control signal supply circuit connected to said controllable semi-conductor rectifier device for supplying control signals thereto; first means connected to supply an alternating reference voltage to said control signal supply circuit; second means for adjusting the phase position of said control signals with respect to said alternating reference voltage; third means for supplying a first voltage which is a function of the required speed of said electric motor; fourth means for supplying a second voltage which is a function of the actual speed of said electric motor; and an error sensing circuit connected to receive and compare said first and said second vcoltages and connected to said second means for passing thereto an electrical error signal which is a function of the difference between the required and actual speeds of said electric motor; whereby the phase position of said control signals with respect to said alternating reference voltage will be adjusted so as to control the speed of said electric motor in a manner such as to reduce said electrical error signal.

4. A speed control circuit for an electric motor comprising: two controllable semi-conductor rectifier devices connected oppositely and in parallel for supplying current to said electric motor; a control signal supply circuit connected to said controllable semi-conductor rectifier devices for supplying control signals thereto; first means for adjusting the phase position of said control signals to adjust the mean value of current supplied by said rectifier device; an error sensing circuit for producing an electrical error signal which is a function of the difference between the required and the actual speed of said electric motor and connected to apply said electrical error signal to said first means so as to cause the speed of said electric motor to be controlled in a manner such as to reduce the electrical error signal; motor current regulating means; a transistor in said motor current regulating means; second means connected to the base of said transistor for applying thereto a voltage which is a function of current in said electric motor for rendering said transistor conductive when a predetermined motor current is exceeded; and the collector-emitter path of said transistor connected into said error sensing circuit so as to cause said electrical error signal to be modified, when said transistor is rendered conductive, in a manner such as to cause a reduction in the mean value of current in said electric motor.

5. In combination, a centrifuge, an electric motor coupled to said centrifuge, and a speed control circuit for said motor, the speed control circuit comprising: two controllable semi-conductor rectifier devices connected oppositely and in parallel with each other and in series with said motor; a control signal supply circuit connected to said controllable semi-conductor rectifier devices for supplying control signals thereto; first means for adjusting the phase position of said control signals to adjust the mean value of current supplied by said rectifier devices; an error sensing circuit for producing an electrical error signal which is a function of the difference between the required and the actual speed of said electric motor and connected to apply said electrical error signal to said first means so as to cause the speed of said electric motor to be controlled in a manner such as to reduce the electrical error signal; motor current regulating means; a transistor in said motor current regulating means; second means connected to the base of said transistor for applying thereto a voltage which is a function of current in said electric motor for rendering said transistor conductive when a predetermined motor current is exceeded; and the collector-emitter path of said transistor connected into said error sensing circuit so as to cause said electrical error signal to be modified, when said transistor is rendered conductive, in a manner such as to cause reduction in the mean value of current in said electric motor.

6. A speed control circuit for an electric motor comprising: two controllable semi-conductor rectifier devices connected oppositely and in parallel for supplying current to said electric motor; a control signal supply circuit connected to said controllable semi-conductor rectifier devices for supplying control signals thereto; means for supplying a first voltage which is a function of the required speed of said electric motor; means for supplying a second voltage which is a function of the actual speed of said electric motor; an error sensing circuit connected to receive and compare said first and said second voltages and to control said control signal supply circuit, in dependence upon the difference between said required and actual speeds, to adjust the phase position of the control signals and thereby to control the speed of said electric motor; motor current regulating means; a transistor in said motor current regulating means; means connected to apply a voltage which is a function of current in said electric motor to the base of said transistor for rendering said transistor conductive when a predetermined motor current is exceeded; and the collector-emitter path of said transistor connected into said error sensing circuit so as to modify, when said transistor is rendered conductive, the control of said control signal supply circuit to cause a reduction in the mean value of current in said electric motor.

7. A speed control circuit as claimed in claim 6 and comprising: a second transistor; means connecting the base of said second transistor to said means for supplying a second voltage; and contact breaker means connected to said second transistor so as to be actuated to disconnect said electric motor when the voltage at the the base of said second transistor exceeds a predetermined value.

8. A speed control circuit for an electric motor comprising: a first pair of controllable semi-conductor rectifier devices connected oppositely and in parallel for supplying current to said electric motor; a second pair of controllable semi-conductor devices each connected to the control electrodes of a respective one of said first pair of rectifier devices; a control signal supply circuit connected to said second pair of rectifier devices for supplying control signals thereto; first means for adjusting the phase position of said control signals to adjust the mean value of current supplied by said first pair of rectifier devices; an error sensing circuit for producing an electrical error signal which is a function of the difference between the required and the actual speed of said electric motor and connected to apply said electrical error signal to said first means so as to cause the speed of said electric motor to be controlled in a manner such as to reduce the electrical error signal; motor current regulating means; a transistor in said motor current regulating means; second means connected to the base of said transistor for applying thereto a voltage which is a function of current in said electric motor for rendering said transistor conductive when a predetermined motor current is exceeded; and the collector-emitter path of said transistor connected into said error sensing circuit so as to cause said electrical error signal to be modified, when said transistor is rendered conductive, in a manner such as to cause a reduction in the mean value of current in said electric motor.

9. A speed control circuit for an electric motor comprising: a first pair of controlable semi-conductor rectifier devices connected oppositely and in parallel for supplying current to said electric motor; a second pair of controllable semi-conductor devices each connected to the control electrodes of a respective one of said first pair of rectifier devices; a control signal supply circuit connected to said second pair of rectifier devices for supplying control signals thereto; means for supplying a first voltage which is a function of the required speed of said electric motor; means for supplying a second voltage which is a function of the actual speed of said electric motor; an error sensing circuit connected to receive and compare said first and said second voltages and to control said control signal supply circuit, in dependence upon the difference between said required and actual speeds, to adjust the phase position of the control signals and thereby to control the speed of said electric motor; motor current regulating means; a transistor in said motor current regulating means; means connected to apply a voltage which is a function of current in said electric motor to the base of said transistor for rendering said transistor conductive when a predetermined motor current is exceeded; the collector-emitter path of said transistor connected into said error sensing circuit so as to modify, when said transistor is rendered conductive, the control of said control signal supply circuit to cause a reduction in the mean value of current in said electric motor; a second transistor; means connecting the base of said second transistor to said means for supplying a second voltage; and contact breaker means connected to said second transistor so as to be actuated to disconnect said electric motor when the voltage at the base of said transistor exceeds a predetermined value.

10. A speed control circuit for an electric motor comprising: alternating current supply means; a first pair of controllable semi-conductor rectifier devices connected oppositely and in parallel with each other and in series with said supply means; a second pair of controllable semi-conductor rectifier devices each connected to a control electrode of a respective one of said first pair of rectifier devices; a bridge circuit; a saturable reactor comprising one arm of said bridge circuit; outputs of said bridge circuit connected to said second pair of rectifier devices for supplying control signals thereto; first means for supplying a first signal which is a function of the required speed of said electric motor; second means for supplying a second signal which is a function of the actual speed of said electric motor; a first and a second transistor in a long-tailed pair configuration with said first transistor connected to receive said first voltage and said second transistor connected to receive said second voltage; a control winding of said saturable reactor for adjusting the phase position of said control signals connected between the collectors of said first and second transistors so as to enable said actual speed to approach said required speed; motor current regulating means, a third transistor in said motor current regulating means; means connected to supply a voltage which is a function of current in said electric motor to the base of said third transistor for rendering said third transistor conductive when a predetermined motor current is exceeded; the collector-emitter path of said third transistor connected to said control winding so as to cause, when said third transistor is rendered conductive, the mean value of current in said electric motor to be reduced; biasing means connected to said third transistor; a variable resistance in said biasing means for determining said predetermined current; a fourth transistor; means connecting the base of said fourth transistor to said second means for supplying a second signal; and contact breaker means connected to said fourth transistor so as to be actuated to disconnect said electric motor when the voltage at the base of said fourth transistor exceeds a predetermined value.

References Cited by the Examiner
UNITED STATES PATENTS

| | | | |
|---|---|---|---|
| 3,024,401 | 3/1962 | Dinger | 318—327 |
| 3,064,174 | 11/1962 | Dinger | 318—331 |
| 3,082,367 | 3/1963 | Alexanderson | 318—513 X |
| 3,123,757 | 3/1964 | Gaudet | 318—327 |

ORIS L. RADER, *Primary Examiner.*

J. C. BERENZWEIG, *Assistant Examiner.*